US011221865B2

(12) United States Patent
Shankar et al.

(10) Patent No.: US 11,221,865 B2
(45) Date of Patent: Jan. 11, 2022

(54) BATCH MANAGEMENT OF OPERATIONS OVER VIRTUALIZED ENTITIES

(71) Applicant: Nutanix, Inc., San Jose, CA (US)

(72) Inventors: Anjana Shankar, Karnataka (IN); Saurabh Kumar Singh, Karnataka (IN); Gourab Baksi, Kolkata (IN); Niramayee Shrikant Sarpotdar, Maharasthtra (IN); Sai Sruthi Sagi, Karnataka (IN)

(73) Assignee: Nutanix, Inc., San Jose, CA (US)

( * ) Notice: Subject to any disclaimer, the term of this patent is extended or adjusted under 35 U.S.C. 154(b) by 318 days.

(21) Appl. No.: 16/051,288

(22) Filed: Jul. 31, 2018

(65) Prior Publication Data

US 2020/0042339 A1 Feb. 6, 2020

(51) Int. Cl.
*G06F 9/455* (2018.01)
*G06F 21/31* (2013.01)
*G06F 8/61* (2018.01)

(52) U.S. Cl.
CPC ............ *G06F 9/45558* (2013.01); *G06F 8/61* (2013.01); *G06F 21/31* (2013.01);
(Continued)

(58) Field of Classification Search
CPC ........ G06F 21/31; G06F 8/61; G06F 9/45558; G06F 2009/45562; G06F 2009/45579; G06F 2009/45587
See application file for complete search history.

(56) References Cited

U.S. PATENT DOCUMENTS 8,549,518 B1  10/2013  Aron et al.
8,601,473 B1  12/2013  Aron et al.
(Continued)

FOREIGN PATENT DOCUMENTS

WO  WO 2016090890 A1  6/2016
WO  WO 2018192475 A1  10/2018

OTHER PUBLICATIONS

Poitras, Steven "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Meng Ai T An
*Assistant Examiner* — Willy W Huaracha
(74) *Attorney, Agent, or Firm* — Vista IP Law Group, LLP

(57) ABSTRACT

Systems and methods for batching operations in a virtualization environment. A method embodiment operates over a plurality of virtual machines in the virtualization environment. A user interface is used to select two or more virtual machines that are to be subjected to the same batch actions. A method step then generates at least one batch request to be performed over the two or more selected virtual machines. In forming the batch request, the states of the individual virtual machines are analyzed to determine one or more entity-specific operations that apply to the virtual machines and/or to constituent entities of the virtual machines. Once the state-specific and entity-specific operations have been determined, an entity management protocol initiates execution of the one or more entity-specific operations over the individual ones of the two or more selected virtual machines.

21 Claims, 11 Drawing Sheets

(52) U.S. Cl.
CPC .............. *G06F 2009/45562* (2013.01); *G06F 2009/45579* (2013.01); *G06F 2009/45587* (2013.01)

(56) References Cited

U.S. PATENT DOCUMENTS

| | | | |
|---|---|---|---|
| 8,850,130 | B1 | 9/2014 | Aron et al. |
| 9,772,866 | B1 | 9/2017 | Aron et al. |
| 9,946,563 | B2 | 4/2018 | Geibel et al. |
| 10,007,542 | B2 | 6/2018 | Hegdal et al. |
| 2009/0013321 | A1* | 1/2009 | Mattiocco ............... G06F 9/455 718/1 |
| 2009/0313620 | A1* | 12/2009 | Sedukhin ............ G06F 9/45558 718/1 |
| 2011/0131572 | A1* | 6/2011 | Elyashev ............ G06F 9/45558 718/1 |
| 2011/0209145 | A1 | 8/2011 | Chen et al. |
| 2012/0110650 | A1* | 5/2012 | Van Biljon ............ G06Q 40/00 726/4 |
| 2012/0131577 | A1* | 5/2012 | Arcese ................ G06F 9/44521 718/1 |
| 2013/0232480 | A1* | 9/2013 | Winterfeldt ............... G06F 8/60 717/177 |
| 2015/0378765 | A1* | 12/2015 | Singh ........................ G06F 9/50 718/1 |
| 2016/0283263 | A1 | 9/2016 | Tsirkin et al. |
| 2016/0380909 | A1* | 12/2016 | Antony ................... H04L 49/70 370/236 |
| 2017/0109186 | A1* | 4/2017 | Figueroa ............ G06F 9/45558 |
| 2018/0300167 | A1 | 10/2018 | Zheng et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
"Enabling and Mounting NGT Simultaneously on Multiple VMs", May 15, 2018, 1 page.
Cano, I. et al., "Curator: Self-Managing Storage for Enterprise Clusters", 14th USENIX Symposium on Networked Systems Design and Implementation, NSDI '17, (Mar. 27, 2017).
Wallace, G. et al., "Manage updates for multiple machines", Azure Automation User Documentation, *Microsoft Azure*, (Mar. 26, 2020).
VMware, "VMware vSphere Documentation", VMware Docs, (Sep. 6, 2019) (Publication date based on indicated capture date by Archive.org; first publication date unknown).
VMware, "Batch Operations", vSphere Design Standards, *VMware {code}*, (Jan. 22, 2017).

* cited by examiner

BATCH MANAGEMENT OF OPERATIONS OVER VIRTUALIZED ENTITIES

FIELD

This disclosure relates to computing systems, and more particularly to techniques for batch management of operations over virtualized entities.

BACKGROUND

Users of modern virtualized computing systems desire some mechanism for managing a broad variety of heterogeneous virtualized entities in their systems. Such virtualized entities (VEs) might include virtual machines (VMs), virtual disks (vDisks), virtual network interface cards (vNICs), executable containers (ECs), and/or other virtualized entities. In some cases, a single computing system might comprise scores of computing nodes that in turn host hundreds or even thousands of such VEs. Providers of virtualized computing systems often provide user interfaces to facilitate management of the VEs by various users. For example, such a user interface might be accessed by a system administrator to execute an action so as to achieve a certain outcome (e.g., state change) at the VM the system administrator is managing. In many cases, the system administrator might want to achieve the same outcome over a large number of VMs. In such cases, differences in the then-current state of each particular VM might impact the ability to achieve the intended state change or outcome.

Unfortunately, the aforementioned user interfaces do not provide a mechanism for executing actions over a batch of VMs that might be in various different states. To accommodate the varying states of the VMs, many approaches require that the system administrator specify a desired action one-by-one for each one of the large number of VMs. In some cases, the action (e.g., installing an application) might require that the system administrator login to each VM. As such, performing the action one by one over the large number of VMs becomes cumbersome for the system administrator and consumes a significant amount of computing resources.

This situation becomes further complicated when the steps and/or operations executed to achieve the desired outcome at each VM are dependent on the then-current states of the VMs. In this situation, the system administrator must first check the then-current state of a subject VM and apply one or more variations to the steps or operations as needed based on the then-current state of the subject VM. As the number of VMs that are used in a virtualized computing system increases, the burden on the system administrator as well as the computing resources consumed to manage the VMs becomes greater and greater. What is needed is a technological solution for performing batch operations over a group of VMs that are in varying states.

SUMMARY

The present disclosure describes techniques used in systems, methods, and in computer program products for batch management of operations over virtualized entities, which techniques advance the relevant technologies to address technological issues with legacy approaches. More specifically, the present disclosure describes techniques used in systems, methods, and in computer program products for batch management of virtualized entities in virtualization environments. Certain embodiments are directed to technological solutions for applying a rule base to the then-current state attributes of a selected batch of virtualized entities to determine the operations to be executed so as to achieve a desired outcome at the virtualized entities.

The disclosed embodiments modify and improve over legacy approaches. In particular, the herein-disclosed techniques provide technical solutions that address the technical problems attendant to performing batch operations over a group of virtualized entities that are in varying states. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. For example, when performing batch operations over a group of virtualized entities that are in varying states, memory usage and CPU cycles demanded are dramatically reduced as compared to the memory usage and CPU cycles that would be needed but for application of the herein-disclosed techniques.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of hyperconverged computing platform management as well as advances in various technical fields related to user interfaces.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
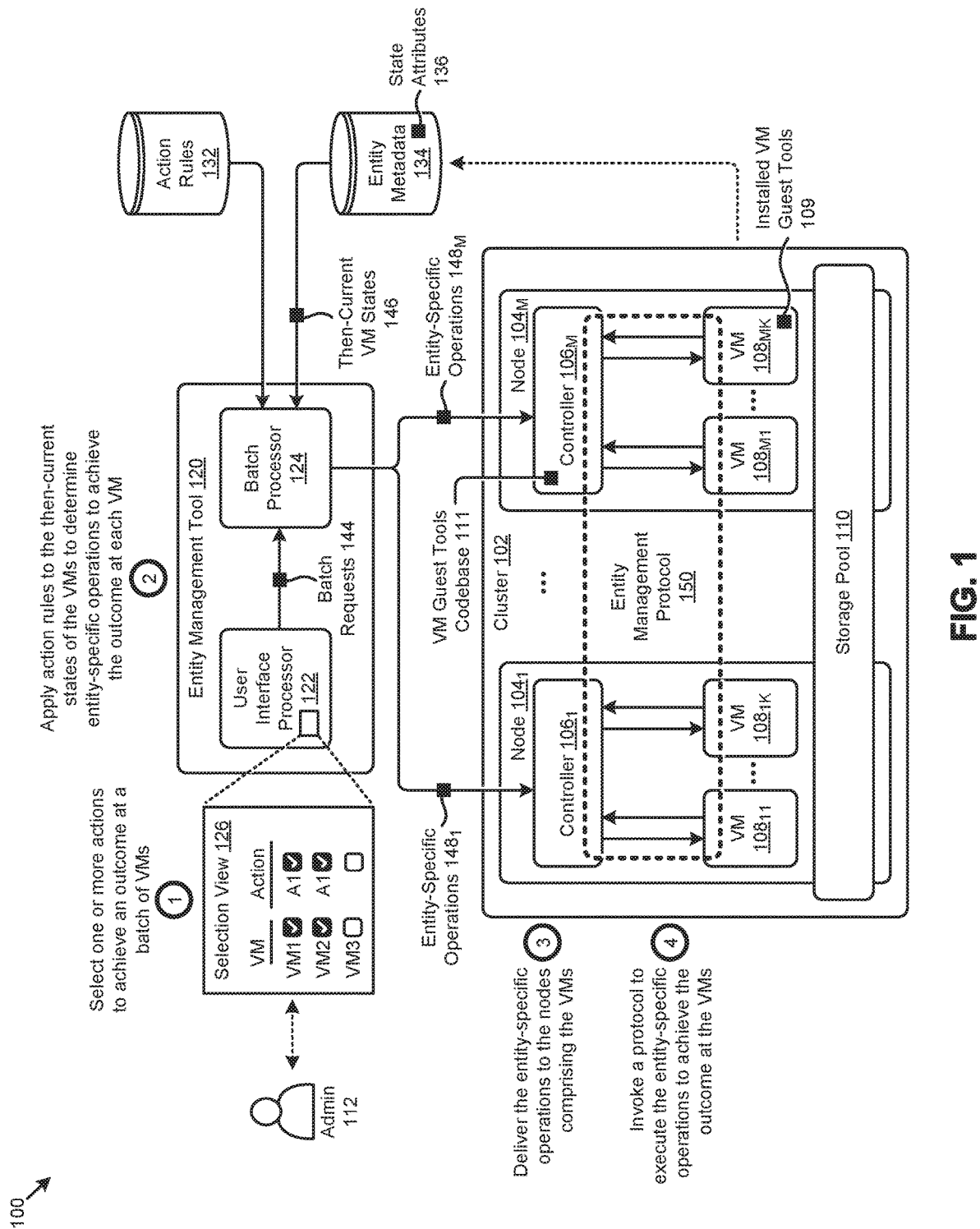
FIG. 1 depicts a computing environment in which embodiments of the present disclosure can be implemented.

Embodiments in accordance with the present disclosure address the problem of performing batch operations over a group of virtualized entities that are in varying states. Some embodiments are directed to approaches for applying a rule base to the then-current state attributes of a selected batch of virtualized entities to determine the operations to be executed so as to achieve a desired outcome at the virtualized entities. The accompanying figures and discussions herein present example environments, systems, methods, and computer program products for batch management of virtualized entities in virtualization environments.

Overview

Disclosed herein are techniques for applying a rule base to the then-current state attributes of a selected batch of virtualized entities to determine steps or operations to perform so as to achieve a specified desired outcome at all of the selected batch of virtualized entities. In certain embodiments, the virtualized entities are VMs implemented in a heterogeneous virtualization environment. A user interface is invoked to select a batch of selected VMs, and to specify one or more batch actions so as to achieve a desired outcome at the selected VMs. For example, a system administrator might select one or more applications to install on the selected VMs. Various state attributes that characterize the respective states of the selected VMs are accessed. A set of action rules are applied to the state attributes to determine a set of entity-specific operations to execute at each respective VM to achieve the target outcome (e.g., install one or more applications).

As an example, a first VM might require that a service is installed and enabled before installing the particular application, while a second VM might already have the service installed and enabled. The entity-specific operations are then executed at the VMs to achieve the target outcome at each of the VMs. In certain embodiments, a controller (e.g., a controller VM) in the virtualization environment communicates with the VMs through a hypervisor-agnostic layer. In certain embodiments, user authentication credentials are received at the user interface to facilitate one or more of the entity-specific operations.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 depicts a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates an environment where a rule base is applied to a set of then-current state attributes of a selected batch of virtualized entities. Processing steps carried out within the environment serve to determine the operations to be executed so as to achieve a desired outcome at the virtualized entities. Specifically, the figure presents a logical depiction of how the herein disclosed techniques can be implemented in a computing environment (e.g., a virtualization environment).

The environment of FIG. 1 includes representative computing nodes (e.g., node $104_1$, ..., node $104_M$) in a cluster 102 that facilitates instantiation of various virtualized entities to perform certain computing tasks. Specifically, a representative set of virtual machines (e.g., VM $108_{11}$, VM $108_{1K}$, VM $108_{M1}$, ... VM $108_{MK}$) are shown as instantiated at the nodes. As can be observed, the virtual machines (VMs) access a storage pool 110 associated with the nodes through a respective storage I/O (input/output or IO) controller (e.g., controller $106_1$ at node $104_1$, and controller $106_M$ at node $104_M$). An instance of such a controller is instantiated at each node. In some cases, such a controller is a hypervisor. In some cases, the controller is a node-specific virtual machine that runs on top of a hypervisor. In some cases, the controller is a combination of a hypervisor plus additional code such as a hypervisor plug-in or a hypervisor agent.

As earlier described, a system administrator (e.g., admin 112) might desire some mechanism for managing the VMs and/or other virtualized entities (e.g., vDisks, vNICs, ECs, etc.) at cluster 102.

The herein disclosed techniques include mechanisms that serve to perform batched operations over groups of virtualized entities that are in varying states. Specifically, a batch processor 124 and a user interface processor 122 are implemented in an entity management tool 120 in computing environment 100. A selection view 126 at a user interface is accessed (e.g., by admin 112) to select a batch of selected VMs and to specify one or more batch actions so as to achieve a desired outcome at the selected VMs (operation 1). For example, admin 112 might select one or more applications to install on the selected VMs. The batch actions and selected VMs are codified into one or more batch requests 144 that are received at batch processor 124. Various instances of state attributes 136 that characterize a respective set of the then-current VM states 146 of the selected VMs are acquired from a set of entity metadata 134 by batch processor 124.

A set of action rules 132 are applied to the state attributes 136 to determine instances of entity-specific operations to execute at each respective selected VM to achieve the target outcome (operation 2). As an example, VM 108$_{M1}$ might require that a code library or support tools (e.g., the shown VM guest tools 111) needs to be installed before enabling a particular application, while VM 108$_{MK}$ might already have the code library or support tools installed (e.g., the shown installed VM guest tools 109) and merely needs to enable the application. The entity-specific operations are issued to the controllers of the nodes hosting the selected VMs to be executed at those selected VMs (operation 3). For example, certain instances of entity-specific operations 148$_1$ are issued to controller 106$_1$ of node 104$_1$ to execute over VM 108$_{11}$, VM 108$_{1K}$, and/or other VMs at node 104$_1$, and entity-specific operations 148$_M$ are issued to controller 106$_M$ of node 104$_M$ to execute over VM 108$_{M1}$, VM 108$_{MK}$, and/or other VMs at node 104$_M$. In the shown embodiment, an entity management protocol 150 is invoked to execute the entity-specific operations over the selected VMs so as to achieve the desired outcome of the specified batch actions (operation 4). In many cases, in order to achieve a particular desired outcome at a VM, the VM might need support from the aforementioned VM guest tools. For example, in order to achieve the desired outcome of enabling a particular application for a particular VM, the VM guest tools would need to be installed into that VM before enabling the particular application. As such, a protocol for installing the VM guest tools into a VM is supported by the entity management protocol 150.

The virtualized entity batch management capabilities facilitated by the herein disclosed techniques result in improvements in computer functionality that serve to reduce the demand for computer processing power, reduce the demand for computer memory and data storage, reduce network bandwidth use, and reduce the demand for inter-component communication in virtualization environments. Specifically, applications of the herein disclosed techniques eliminate the need to execute certain actions one-by-one at individual ones of a set of selected VMs, thereby substantially reducing the computing resources to administer and/or execute batch actions at the selected VMs.

One embodiment of techniques for batch management of virtualized entities is disclosed in further detail as follows.

Figure 2:
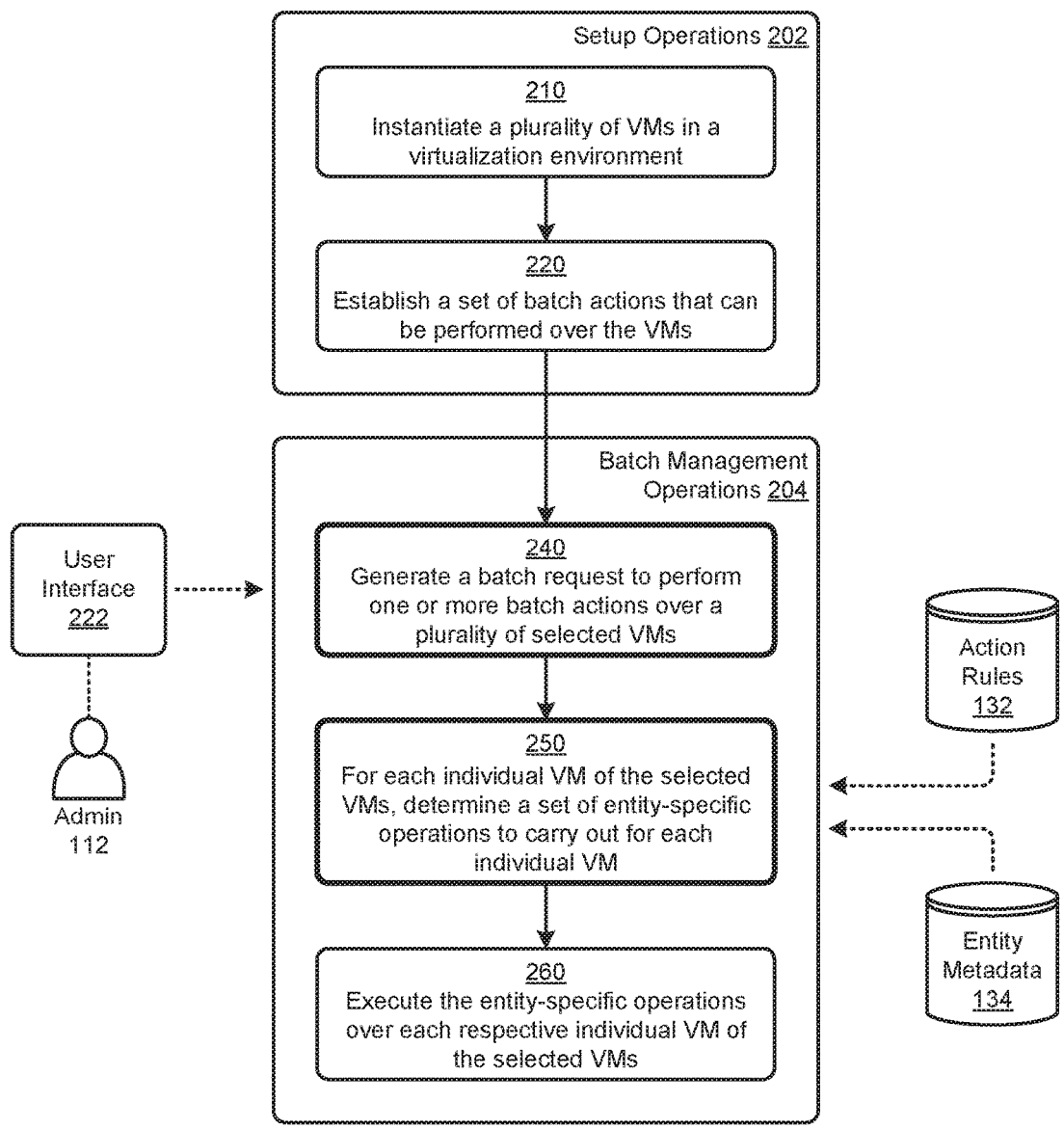
FIG. 2 presents a virtualized entity batch management technique as implemented in systems that facilitate batch management of virtualized entities in virtualization environments, according to an embodiment.

FIG. 2 presents a virtualized entity batch management technique 200 as implemented in systems that facilitate batch management of virtualized entities in virtualization environments. As an option, one or more variations of virtualized entity batch management technique 200 or any aspect thereof may be implemented in the context of the architecture and functionality of the embodiments described herein. The virtualized entity batch management technique 200 or any aspect thereof may be implemented in any environment.

FIG. 2 illustrates one aspect pertaining to applying a rule base to the then-current state attributes of a selected batch of virtualized entities to determine the operations to be executed so as to achieve a desired outcome at the virtualized entities. Specifically, the figure presents one embodiment of certain steps and/or operations that facilitate performing batch operations over a set of selected virtualized entities based at least in part on the then-current states of the virtualized entities. As can be observed the steps and/or operations can be partitioned into a set of setup operations 202 and a set of batch management operations 204.

The setup operations 202 of virtualized entity batch management technique 200 can commence by instantiating a plurality of VMs in a virtualization environment (step 210). Instantiating a plurality of VMs is merely one example, and other types of virtualized entities can be managed in bulk according to the herein disclosed techniques. A set of batch actions that can be performed over the VMs is established (step 220). In some cases, a batch action might be represented by an abstracted instruction that indicates the desired outcome of the action at a target virtualized entity, where the action requires several operations to be carried out. For example, a batch action to "Install VM guest tools" might require multiple operations (e.g., between a controller and a target VM) to complete the installation of the VM guest tools. In example embodiments, the VM guest tools comprise facilities that are used by and between a controller and a VM. Such facilities might include communication protocols that are used between a controller and a VM so that a VM can avail itself of functions of applications that are supported (e.g., in whole or in part) by the controller. As such, some facilities of the VM guest tools are situated in the controller, whereas other facilities of the VM guest tools are situated in a VM. In addition to the aforementioned applications that are supported by the VM guest tools, the VM guest tools can sometimes augment the capabilities of the operating system that underlies a particular VM. Specifically, the VM guest tools can provide functionality that is not provided by the underlying operating system of the VM. The controller can maintain a copy of the codebase of the VM guest tools in a format that can be mounted by a guest operating system of a VM.

The batch management operations 204 of virtualized entity batch management technique 200 can commence by generating a batch request to perform one or more of the batch actions at a plurality of selected VMs from the VMs (step 240). As can be observed, the batch actions and/or the selected VMs might be specified by admin 112 via user interface 222. For each individual VM of the selected VMs, a set of entity-specific operations that serve to carry out actions at the individual VM is determined (step 250). According to the herein disclosed techniques, the entity-specific operations are determined based at least in part on the then-current state of the individual VM, which then-current state can be derived, for example, from entity metadata 134. In some cases, the entity-specific operations are determined at least in part by applying a rule base (e.g., action rules 132) to the state attributes representing the then-current state and/or to other information. The entity-specific operations are then executed at each respective individual VM of the selected VMs (step 260). The execution of the entity-specific operations over the selected VMs is often performed concurrently (e.g., in parallel).

One embodiment of a system for implementing the virtualized entity batch management technique 200 and/or other herein disclosed techniques is disclosed as follows.

Figure 3A:
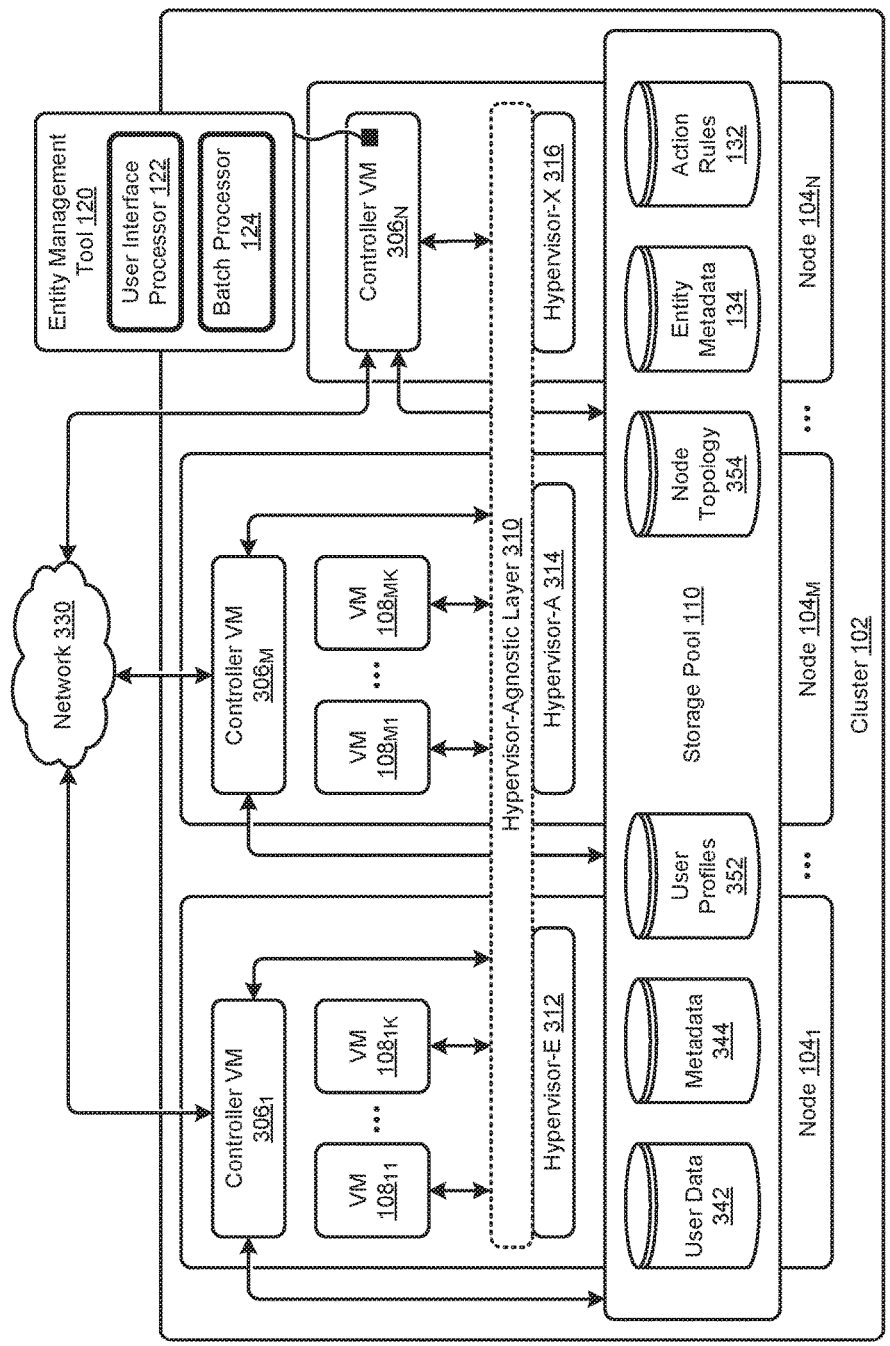
FIG. 3A is a block diagram of a system that implements batch management of virtualized entities, according to an embodiment.

FIG. 3A is a block diagram of a system 3A00 that implements batch management of virtualized entities. As an option, one or more variations of system 3A00 or any aspect thereof may be implemented in the context of the architecture and functionality of the embodiments described herein. The system 3A00 or any aspect thereof may be implemented in any environment.

FIG. 3A illustrates one aspect pertaining to applying a rule base to the then-current state attributes of a selected batch of virtualized entities to determine the operations to be executed so as to achieve a desired outcome at the virtualized entities. Specifically, the figure is being presented to show one embodiment of certain representative components and associated data flows that describes how the herein disclosed techniques might be implemented in a virtualization environment. The components and data flows shown in FIG. 3A present one partitioning and associated data manipulation approach. The specific example shown is purely exemplary, and other subsystems, data structures, and/or partitioning are reasonable.

As shown in FIG. 3A, the system 3A00 comprises three representative nodes (e.g., node $104_1$, . . . , node $104_M$, . . . , node $104_N$) that have multiple tiers of storage in a storage pool 110. Each node can be associated with one server, multiple servers, or portions of a server. The nodes can be associated (e.g., logically and/or physically) with one or more computing clusters, such as cluster 102. The multiple tiers of storage of storage pool 110 can include instances of local storage. For example, the local storage can be within or directly attached to a server and/or appliance associated with the nodes. Such local storage can include solid state drives (SSDs), hard disk drives (HDDs), and/or other storage devices. In some embodiments, the multiple tiers of storage can include storage that is accessible through a network 330 such as a networked storage (e.g., a storage area network or SAN, network attached storage or NAS, etc.).

As shown, any of the nodes of system 3A00 can implement one or more virtualized entities, such as virtual machines (e.g., VM $108_{11}$, VM $108_{1K}$, VM $108_{M1}$, . . . , VM $108_{MK}$, controller VM $306_1$, . . . , controller VM $306_M$, . . . , controller VM $306_N$) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by one of a variety of heterogeneous hypervisors (e.g., hypervisor-E 312, hypervisor-A 314, or hypervisor-X 316), which hypervisors are logically located between the various guest operating systems of the VMs and the host operating system of the physical infrastructure (e.g., the nodes).

As an alternative, executable containers may be implemented at the nodes in an operating system-based virtualization environment or container virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system without, in most cases, a hypervisor layer. This lightweight implementation can facilitate efficient distribution of certain software components such as applications or services (e.g., micro-services). Any node of system 3A00 can implement both a hypervisor-assisted virtualization environment and a container virtualization environment for various purposes.

Furthermore, any node in system 3A00 can implement a virtualized controller to facilitate, at least in part, access to storage facilities (e.g., storage pool 110, networked storage, etc.) by the VMs and/or the executable containers operating at the node. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor). As can be observed in system 3A00, an instance of a virtual machine (e.g., controller VM $306_1$, controller VM $306_M$, and controller VM $306_N$) at each representative node is used as a virtualized controller. The controller VMs of the nodes in system 3A00 interact using communications over network 330.

The virtualized entities at the nodes of system 3A00 can interface with the controller VMs of the nodes through a hypervisor-agnostic layer 310. The hypervisor-agnostic layer 310 facilitates communications between the controller VMs and the virtualized entities (e.g., other VMs) at the nodes that are independent of the underlying hypervisor. As such, varying virtual machine architectures and/or hypervisors can operate with the system 3A00. For example, a hypervisor (e.g., hypervisor-E 312) at one node might correspond to software from a first vendor, while another hypervisor (e.g., hypervisor-A 314) at another node might correspond to a second software vendor. As another virtualized controller implementation example, executable containers (e.g., Docker containers) can be used to implement a virtualized controller in an operating system virtualization environment at a given node.

In this case, for example, the virtualized entities at a particular node can interface with a controller container through a hypervisor and/or the kernel of the host operating system of the node. Such interactions between the virtualized entities and controllers at the nodes often pertain to various instances (e.g., replicated instances) of user data 342 and metadata 344 that are distributed over the storage pool 110 to facilitate certain tasks and/or operations performed at virtualized entities.

Other components are implemented in system 3A00 to facilitate the herein disclosed techniques. Specifically, an instance of entity management tool 120 that comprises user interface processor 122 and batch processor 124 might be implemented at controller VM $306_N$ of node $104_N$. To further facilitate the herein disclosed techniques, various storage facilities are implemented in storage pool 110 for access by entity management tool 120 and/or the controller VMs of the nodes associated with the storage pool. Specifically, and as shown, such storage facilities store and/or organize data pertaining to the authentication and/or authorization credentials of the system users (e.g., stored in user profiles 352), the structure and/or organization of the cluster entities (e.g., stored in node topology 354), the configuration of the virtualized entities of the cluster (e.g., stored in entity metadata 134), the rules for determined entity-specific operations from batch actions (e.g., store in action rules 132), and/or data pertaining to other aspects of the herein disclosed techniques.

Further details of the data structures associated with the foregoing storage facilities and/or other data objects access by the herein disclosed techniques are disclosed as follows.

Figure 3B:
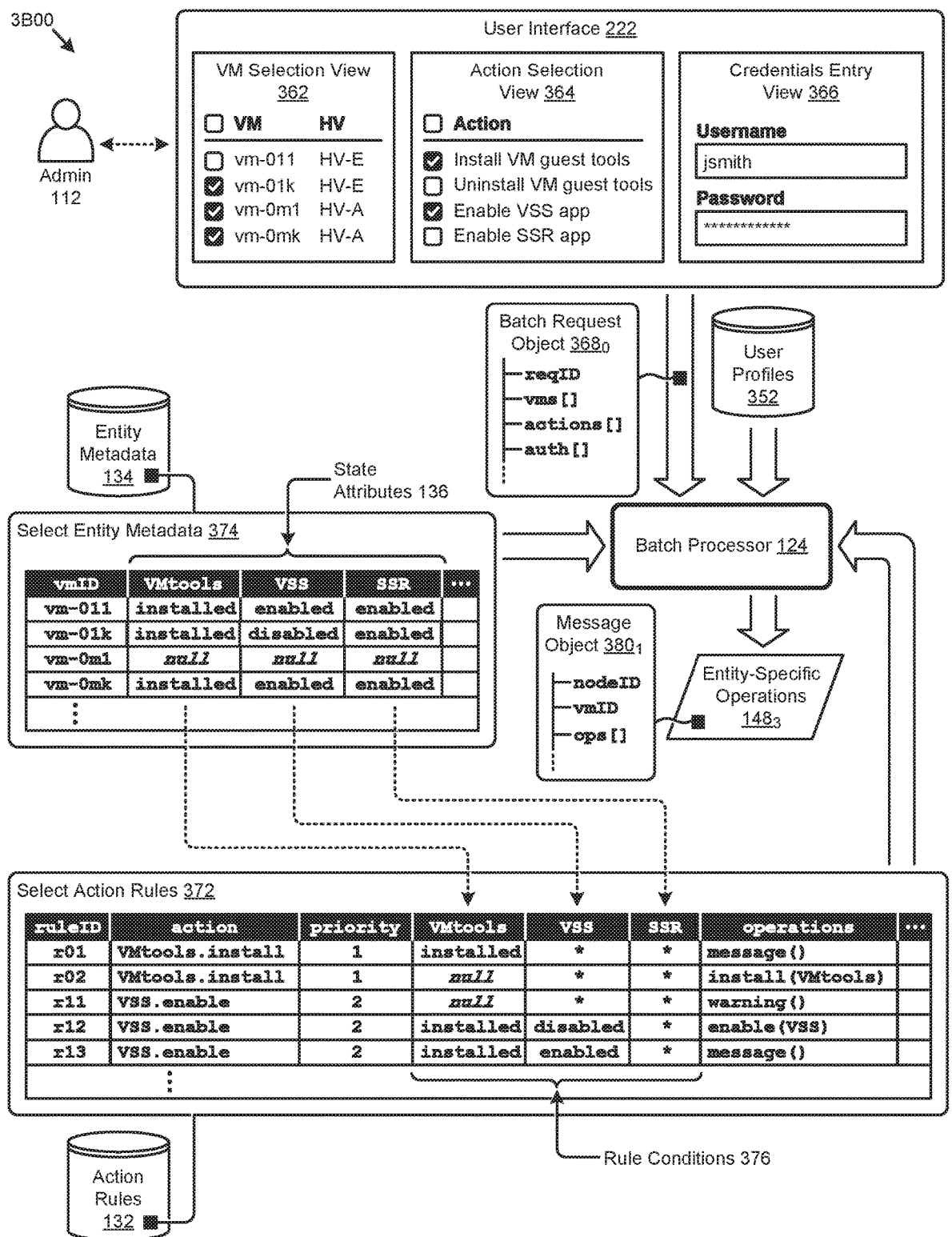
FIG. 3B depicts a set of specialized data structures that improve the way a computer uses data in memory when performing steps pertaining to batch management of virtualized entities in virtualization environments, according to some embodiments.

FIG. 3B depicts a set of specialized data structures 3B00 that improve the way a computer uses data in memory when performing steps pertaining to batch management of virtualized entities in virtualization environments. As an option, one or more variations of specialized data structures 3B00 or any aspect thereof may be implemented in the context of the architecture and functionality of the embodiments described herein. The specialized data structures 3B00 or any aspect thereof may be implemented in any environment.

FIG. 3B illustrates one aspect pertaining to applying a rule base to the then-current state attributes of a selected batch of virtualized entities to determine the operations to be executed so as to achieve a desired outcome at the virtualized entities. Specifically, the figure is being presented to illustrate one embodiment of data structures that can be implemented to organize certain data used when implementing the herein disclosed techniques. The figure furthers illustrates a logical depiction of data flows of such data in an example scenario as performed in accordance with the herein disclosed techniques.

As shown in FIG. 3B, various views are presented to admin 112 via a user interface 222 to facilitate initiation of certain batch operations over a set of selected virtualized entities. Specifically, a VM selection view 362 is presented to facilitate selection of a set of selected VMs (e.g., VM "vm-01k", VM "vm-0m1", and VM "vm-0mk") by admin 112. An action selection view 364 is also presented to facilitate selection of the batch actions (e.g., "Install VM guest tools") to perform over the selected VMs. As used herein, "VM guest tools" is a representative codebase (e.g., library) that can be installed on a particular VM. The VM guest tools might include applications that can be operated by the VMs. Strictly as examples, one such application might correspond to a volume snapshot service (VSS) and/or another such application might correspond to a self-service restore (SSR) capability. The foregoing examples are merely representative applications.

In such applications, a portion of the application is included in the VM guest tools and a portion of the application is included in a VM that avails itself of the capabilities of the application. In some cases, use of an application and/or set-up of an application uses user credentials to authenticate and authorize the user. As such, a set of user credentials can be entered in a credentials entry view 366, which user credentials are used to authenticate the user and/or to authorize installation and/or use of applications or certain batch actions.

The information captured in the views presented the user interface is used to form one or more batch requests that are received at batch processor 124. As shown, the information constituting a batch request might be codified according to batch request object 3680. The batch request object indicates that an object associated with a particular batch request might describe a request identifier (e.g., stored in a "reqID" property), a list of selected VMs (e.g., stored in a "vms[ ]" attributes object), a list of batch actions (e.g., stored in an "actions [ ]" attributes object), a set of user credentials (e.g., stored in an "auth[ ]" attributes object), and/or other data pertaining to the batch request. As can be observed, the batch processor 124 might access a set of user profiles 352 to, for example, verify any user credentials provided in the batch requests.

To facilitate the herein disclosed techniques, the batch processor 124 accesses the entity metadata 134 to determine the then-current state of the selected VMs associated with a particular batch request. The data comprising entity metadata 134 and/or any other data described herein can be organized and/or stored using various techniques. For example, the entity metadata 134 might be organized and/or stored in a tabular structure (e.g., relational database table) that has rows that relate various entity attributes with a particular virtualized entity. As another example, the information might be organized and/or stored in a programming code object that has instances corresponding to a particular virtualized entity and properties corresponding to the various attributes associated with the virtualized entity.

As depicted in a set of select entity metadata 374, a data record (e.g., table row or object instance) for a particular VM might describe a VM identifier (e.g., stored in a "vmID" field), an indication of whether the VM guest tools are installed at the VM (e.g., stored in a "VMtools" field), an indication of whether the VSS app is enabled at the VM (e.g., stored in a "vss" field), an indication of whether the SSR app is enabled at the VM (e.g., stored in a "SSR" field), and/or other entity attributes. As can be observed, the data in the "VMtools", "VSS", and "SSR" fields can represent the state attributes 136 that characterize the state of a particular VM. As shown, a particular state can be codified into a string (e.g., "installed", "enabled", "disabled", etc.). In other cases (e.g., to conserve memory consumption), a state might be assigned a numerical value or one or more memory bits representing a numerical value (e.g., "1" represents "enabled", "0" represents "disabled", etc.). In some cases, a particular characteristic can have multiple states. For example, a user access characteristic might have the states "admin only", "owner only", "read only", or "unlimited". As depicted, a "null" field serves to indicate that no state has been yet established (e.g., when the VM guest tools have yet to be installed).

The batch processor 124 also accesses a set of action rules 132 to facilitate processing of received batch requests. A set of rules (e.g., rule base), such as action rules 132 or any other rules described herein, comprise data records storing various information that can be used to form one or more constraints to apply to certain functions and/or operations. For example, information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results.

As depicted in a representative set of select action rules 372 from action rules 132, a data record (e.g., table row or object instance) for a particular action rule might describe a rule identifier (e.g., stored in a "ruleID" field), a subject action (e.g., stored in an "action" field), an execution priority associated with the action (e.g., stored in a "priority" field), a VM guest tools status condition associated with the rule (e.g., stored in a "VMtools" field), a VSS application status condition associated with the rule (e.g., stored in a "VSS"

field), an SSR application status condition associated with the rule (e.g., stored in a "SSR" field), a set of operations to be executed when the rule conditions are satisfied (e.g., stored in an "operations" field), and/or other rule attributes. An "*" in a field indicates any value is acceptable for that condition.

As indicated in FIG. 3B, the state attributes 136 are applied (e.g., by batch processor 124) as rule conditions 376 to select action rules 372 to determine the operations as specified by the rules (e.g., in the "operations" field) to assign as entity-specific operations for a particular VM. For example, the state attributes of VM "vm-0$m$1" match the conditions of rule "r02" indicating that an "install (VM-tools)" operation is to be performed at VM "vm-0$m$1". Since the foregoing operation has a "priority=1", the results of the operation (e.g., VM guest tools are "installed") are applied to rules associated with lower priority actions. As such, rule "r12" also applies to VM "vm-0$m$1" indicating that an "enable (VSS)" operation is to be performed at VM "vm-0$m$1".

The sets of operations derived from the action rules for each of the selected VMs constitute the entity-specific operations $148_3$ produced by the batch processor 124. As earlier mentioned, such entity-specific operations are distributed to the nodes comprising the selected VMs for execution over the VMs. The entity-specific operations might be issued to the nodes in one or more messages. As shown in a message object $380_1$, such messages might describe a node identifier (e.g., stored in a "nodeID" property), a VM identifier (e.g., stored in a "vmID" property), a set of entity-specific operations (e.g., stored in an "ops[ ]" object), and/or other data pertaining to the message.

The foregoing discussions include techniques for generating batch requests to perform batch operations over selected VMs (e.g., step 240 of FIG. 2), which techniques are disclosed in further detail as follows.

Figure 4:
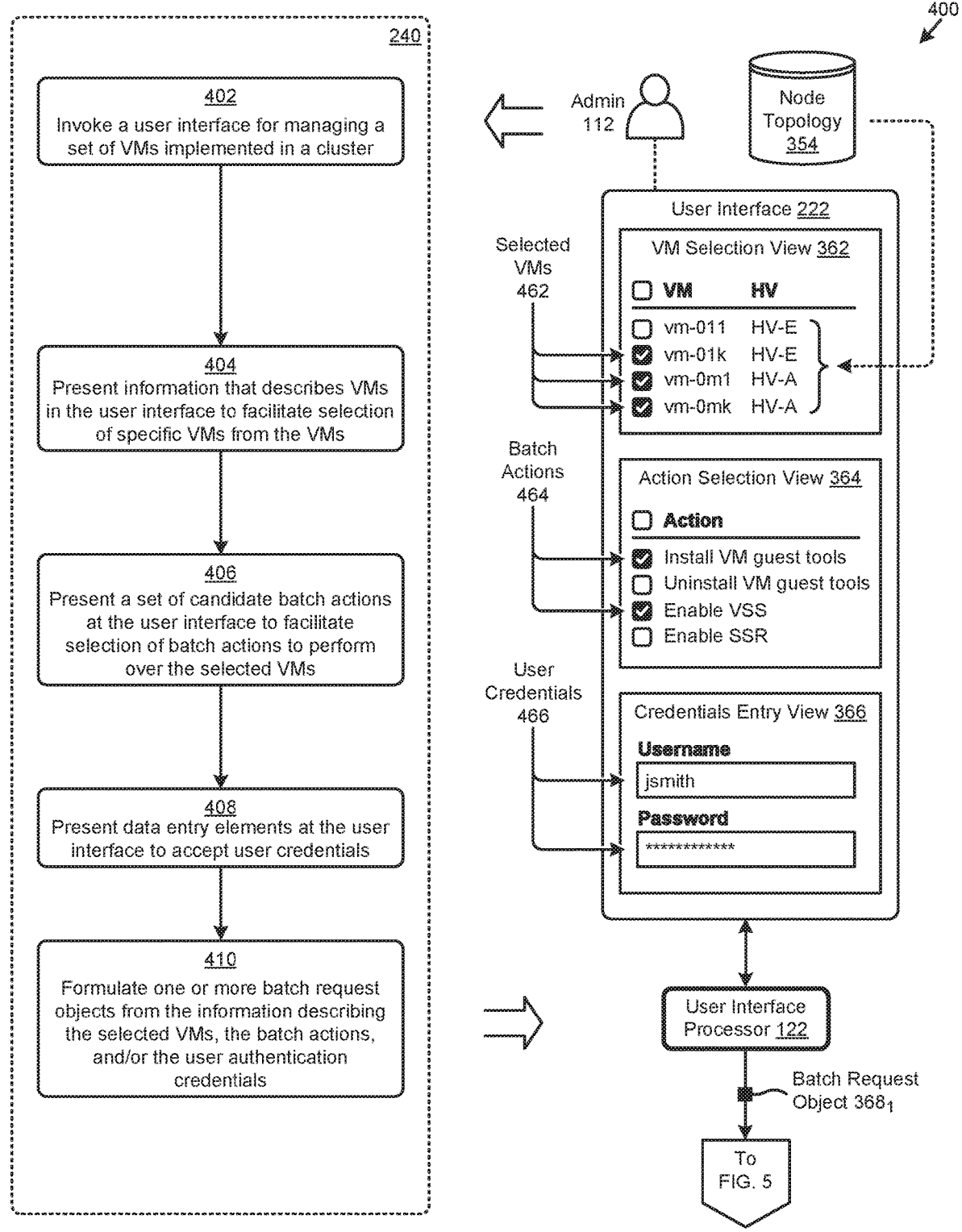
FIG. 4 depicts a batch request generation technique as implemented in systems that facilitate batch management of virtualized entities in virtualization environments, according to some embodiments.

FIG. 4 depicts a batch request generation technique 400 as implemented in systems that facilitate batch management of virtualized entities in virtualization environments. As an option, one or more variations of batch request generation technique 400 or any aspect thereof may be implemented in the context of the architecture and functionality of the embodiments described herein. The batch request generation technique 400 or any aspect thereof may be implemented in any environment.

FIG. 4 illustrates one aspect pertaining to applying a rule base to the then-current state attributes of a selected batch of virtualized entities to determine the operations to be executed so as to achieve a desired outcome at the virtualized entities. Specifically, the figure is presented to illustrate one embodiment of certain steps and/or operations for generating batch requests to perform batch operations over selected VMs. A representative scenario is also shown in the figure to illustrate an example application of the batch request generation technique 400.

The batch request generation technique 400 can commence by invoking a user interface 222 for managing a set of VMs that are implemented in a computing cluster (step 402). As shown, user interface processor 122 might be invoked for access by admin 112 to manage various VMs in a cluster. Certain information that describes the VMs is presented at the user interface to facilitate selection of specific VMs from the VMs (step 404). As an example, the VM selection view 362 might present certain information (e.g., a VM identifier, a hypervisor type, etc.) as derived from a set of node topology data stored in node topology 354. The VM selection view 362 can further comprise selection elements (e.g., checkboxes) to facilitate identification of a set of selected VMs 462. All possible batch actions for the VMs are presented in the user interface to facilitate selection of the batch actions to perform over the selected VMs (step 406). As can be observed, a list of batch actions with corresponding selection elements (e.g., checkboxes) can be presented in action selection view 364 to facilitate selection of a set of batch actions 464. In some cases, certain data entry elements (e.g., text boxes) are presented in the user interface 222 to capture user authentication and/or authorization credentials (step 408). As shown in credentials entry view 366, admin 112 might enter a set of user credentials 466 that comprise a "Username" and a "Password".

Once the batch actions to perform over the selected VMs and any other information (e.g., credentials) needed to perform the batch actions have been collected, then the user interface processor 122 is employed (at step 410) to form one or more batch request objects (e.g., batch request object $368_1$).

The foregoing discussions include techniques for determining entity-specific operations to carry out batch requests at a set of selected VMs (e.g., step 250 of FIG. 2), which techniques are disclosed in further detail as follows.

Figure 5:
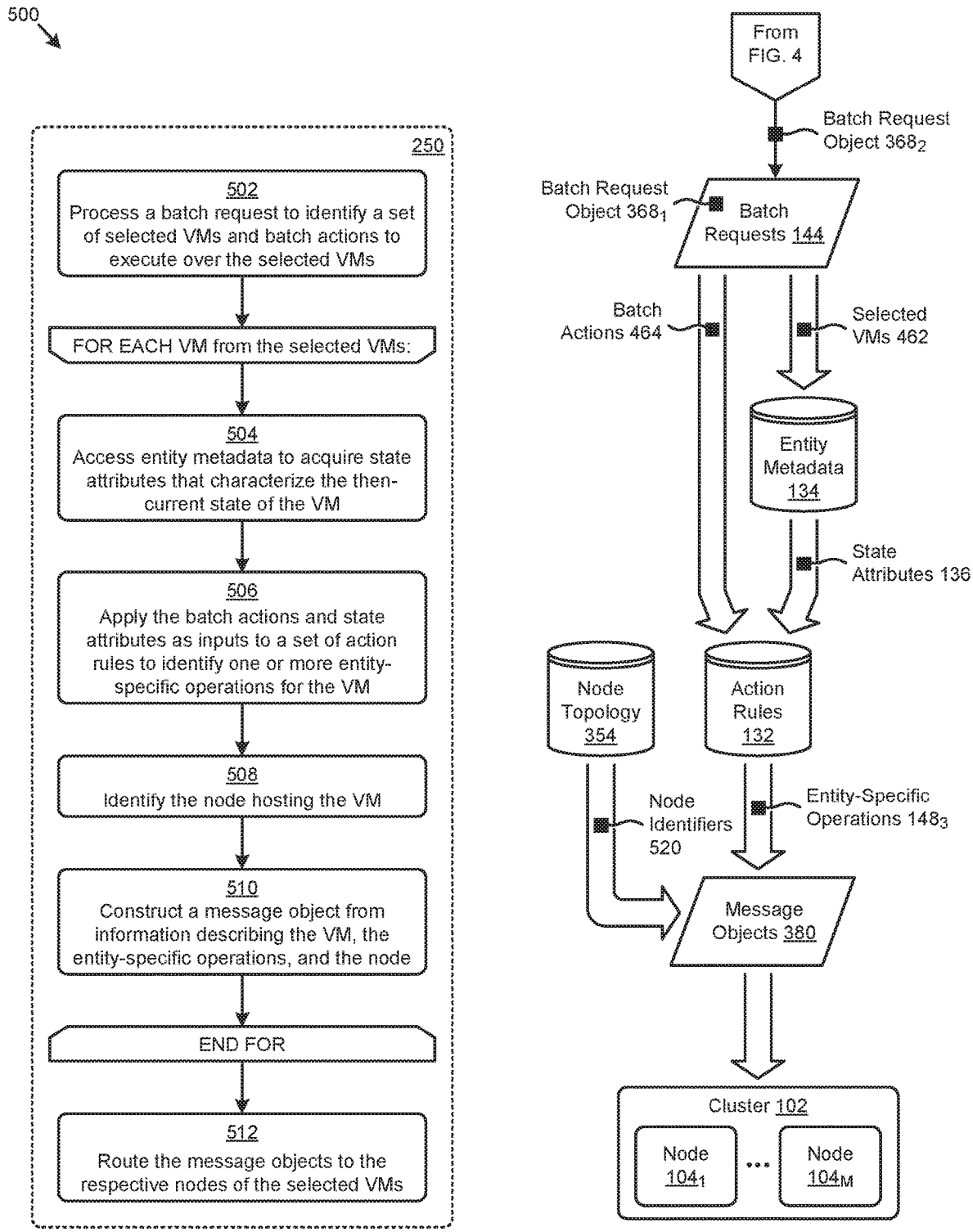
FIG. 5 presents a rule-based operations selection technique as implemented in systems that facilitate batch selection of virtualized entities, according to an embodiment.

FIG. 5 presents a rule-based operations selection technique 500 as implemented in systems that facilitate batch selection of virtualized entities. As an option, one or more variations of rule-based operations selection technique 500 or any aspect thereof may be implemented in the context of the architecture and functionality of the embodiments described herein. The rule-based operations selection technique 500 or any aspect thereof may be implemented in any environment.

FIG. 5 illustrates one aspect pertaining to applying a rule base to the then-current state attributes of a selected batch of virtualized entities to determine the operations to be executed so as to achieve a desired outcome at the virtualized entities. Specifically, the figure is presented to illustrate one embodiment of certain steps and/or operations for accessing action rules to determine entity-specific operations to carry out batch requests at a set of selected VMs. A representative scenario is also shown in the figure to illustrate an example application of the rule-based operations selection technique 500.

The rule-based operations selection technique 500 can commence by processing incoming batch request objects (e.g., batch request object $368_1$ from FIG. 4, or another incoming instance of batch request object $368_2$). The contents of the batch request objects serve to identify a set of selected VMs and batch actions to execute over the selected VMs (step 502). As illustrated, one or more batch request objects from batch requests 144 can be processed to identify the selected VMs 462 and the batch actions 464. At least inasmuch as a batch request object codifies the batch actions to perform over the selected VMs, plus other information (e.g., credentials) needed to perform the batch actions, successive incoming batch request objects can be processed in any sequence.

Each incoming batch request object can then be processed to determine the set of selected VMs such that, for each subject VM in the set of selected VMs (e.g., selected VMs 462), a set of entity metadata is accessed to acquire certain state attributes that characterize the then-current state of the subject VM (step 504). For example, a set of state attributes 136 that correspond to each VM from selected VMs 462 can be collected from entity metadata 134. The batch actions and state attributes for the subject VM are applied as inputs (e.g., conditions) to a set of action rules (e.g., action rules 132) to identify one or more entity-specific operations (e.g., entity-specific operations $148_3$) for the VM (step 506).

The node that hosts the subject VM is identified (step 508) to facilitate construction of a message object to codify information that describes the subject VM as well as the entity-specific operations and node associated with the subject VM (step 510). The node identifiers 520 of the nodes hosting the selected VMs 462 might be stored in node topology 354. The node identifiers 520, entity-specific operations $148_3$, certain information pertaining to the selected VMs 462, and/or other information can be codified into a set of message objects 380 that are routed to the respective nodes of the selected VMs 462 (step 512). As merely one example, the message objects might be routed to node $104_1$ and node $104_M$ of cluster 102 through a hypervisor, possibly through a hypervisor-agnostic layer. Any technique for routing message objects can be used. In some embodiments, message objects are communicated using application programming interfaces (APIs) such as hypervisor-provided APIs. In other embodiments, message objects are communicated securely using transport layer security (TLS) through a hypervisor-agnostic layer. In some cases, an updated codebase of the VM guest tools is provided to the hypervisor, and/or to the hypervisor-agnostic layer. Such a codebase can be packaged as a bootable image (e.g., an ISO image) that can be mounted by a VM with support of the VM's underlying operating system.

A set of scenarios that depict certain batch management actions performed over a plurality of virtualized entities according to the herein disclosed techniques are disclosed as follows.

Figure 6:
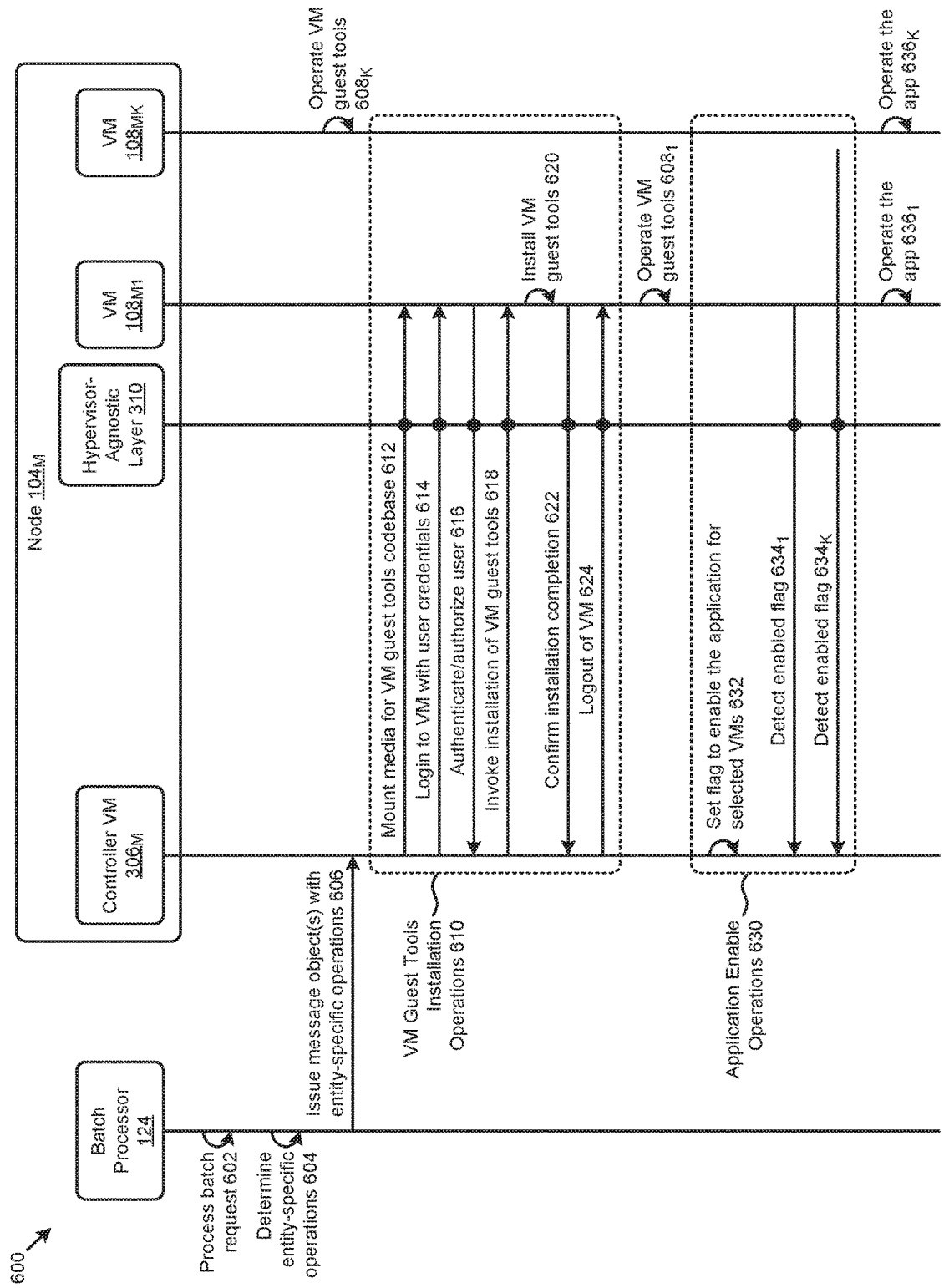
FIG. 6 illustrates various example virtualized entity batch management scenarios as occur in systems that facilitate batch management of virtualized entities, according to an embodiment.

FIG. 6 illustrates various example virtualized entity batch management scenarios 600 as occur in systems that facilitate batch management of virtualized entities. As an option, one or more variations of virtualized entity batch management scenarios 600 or any aspect thereof may be implemented in the context of the architecture and functionality of the embodiments described herein. The virtualized entity batch management scenarios 600 or any aspect thereof may be implemented in any environment.

FIG. 6 illustrates one aspect pertaining to applying a rule base to the then-current state attributes of a selected batch of virtualized entities to determine the operations to be executed so as to achieve a desired outcome at the virtualized entities. Specifically, the figure is being presented to depict a set of high order interactions (e.g., operations, messages, etc.) exhibited by various computing components earlier described that in part comprise one embodiment of a protocol for executing entity-specific operations that carry out batch requests issued in accordance with the herein disclosed techniques. The particular computing components shown in FIG. 6 include the batch processor 124 the controller VM $306_M$, the hypervisor-agnostic layer 310, VM $108_{M1}$, and VM $108_{MK}$ of node $104_M$. The hypervisor-agnostic layer 310 serves at least in part to translate messages between controller VM $306_M$ and the VMs.

As shown, a batch request received at batch processor 124 is processed (operation 602). For the example scenarios of FIG. 6, the batch request processed by batch processor 124 indicates that a set of VM guest tools are to be installed at VM $108_{M1}$ and VM $108_{MK}$ and that a VSS application is to be enabled at both VMs. Respective sets of entity-specific operations to execute over each of the VMs are determined (operation 604) and one or more message objects indicating the entity-specific operations are issued to controller VM $306_M$ (message 606).

Since VM guest tools are currently operating at VM $108_{MK}$ (operation $608_K$), no entity-specific operations pertaining to the VM guest tools installation batch action were assigned to VM $108_{MK}$ by batch processor 124. In contrast, for VM $108_{M1}$, a protocol is invoked to perform a set of VM guest tools installation operations 610 so as to install the VM guest tools on VM $108_{M1}$. The VM guest tools installation operations 610 can commence by mounting media comprising the VM guest tools codebase at VM $108_{M1}$ (message 612). A login to the VM is performed using the user credentials received, for example, in the message object from the batch processor 124 (message 614). Once VM $108_{M1}$ authenticates and/or authorizes the user credentials (message 616), installation of the VM guest tools can be invoked (message 618). After installation of the VM guest tools at VM $108_{M1}$ is performed (operation 620), the installation completion is confirmed (message 622). The controller VM $306_M$ can then logout of VM $108_{M1}$ (message 624) and the VM guest tools can commence operation (operation $608_1$).

As illustrated in FIG. 6, a set of application enable operations 630 are then performed to enable a particular application such as VSS at VM $108_{M1}$ and VM $108_{MK}$. In this example, neither VM has the VSS application enabled, thereby requiring the application to be enabled at both VMs. To enable the particular application at both VM $108_{M1}$ and VM $108_{MK}$, the shown application enable operations 630 are invoked. A flag to enable the application for the selected VMs is set at controller VM $306_M$ (operation 632). In this embodiment, the application access provisioning is managed at controller VM $306_M$. In other embodiments, other provisioning approaches are possible. When VM $108_{M1}$ and VM $108_{MK}$ each detect the enabled flag (message $634_1$ and message $634_K$, respectively), the particular application-specific operations can commence at each VM (operation $636_1$ and operation $636_K$, respectively).

Additional Embodiments of the Disclosure

Additional Practical Application Examples

Figure 7:
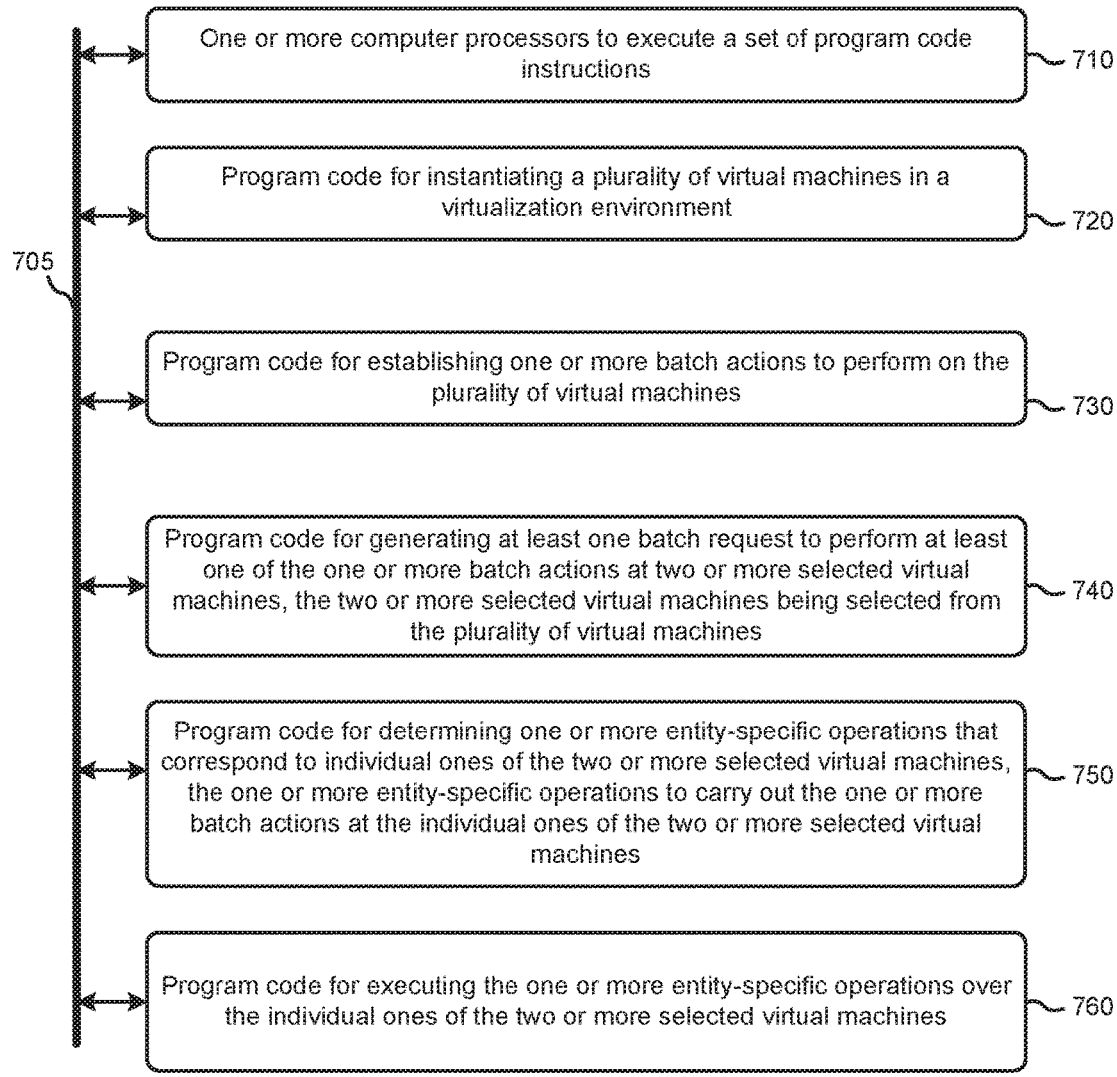
FIG. 7 depicts system components as arrangements of computing modules that are interconnected so as to implement certain of the herein-disclosed embodiments.

FIG. 7 depicts system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address how to perform batch operations over a group of virtualized entities that are in varying states. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with any other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: instantiating a plurality of virtual machines in a virtualization environment (module 720); establishing one or more batch actions to perform on the plurality of virtual machines (module 730); generating at least one batch request to perform at least one of the one or more batch actions at two or more selected virtual machines, the two or more selected virtual machines being selected from the plurality of virtual machines (module 740); determining one or more entity-specific operations that correspond to individual ones of the two or more selected virtual machines, the one or more entity-specific operations to carry out the one or more batch actions at the individual ones of the two or more selected virtual machines (module 750); and executing the one or more entity-specific operations over the individual ones of the two or more selected virtual machines (module 760).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 8A:
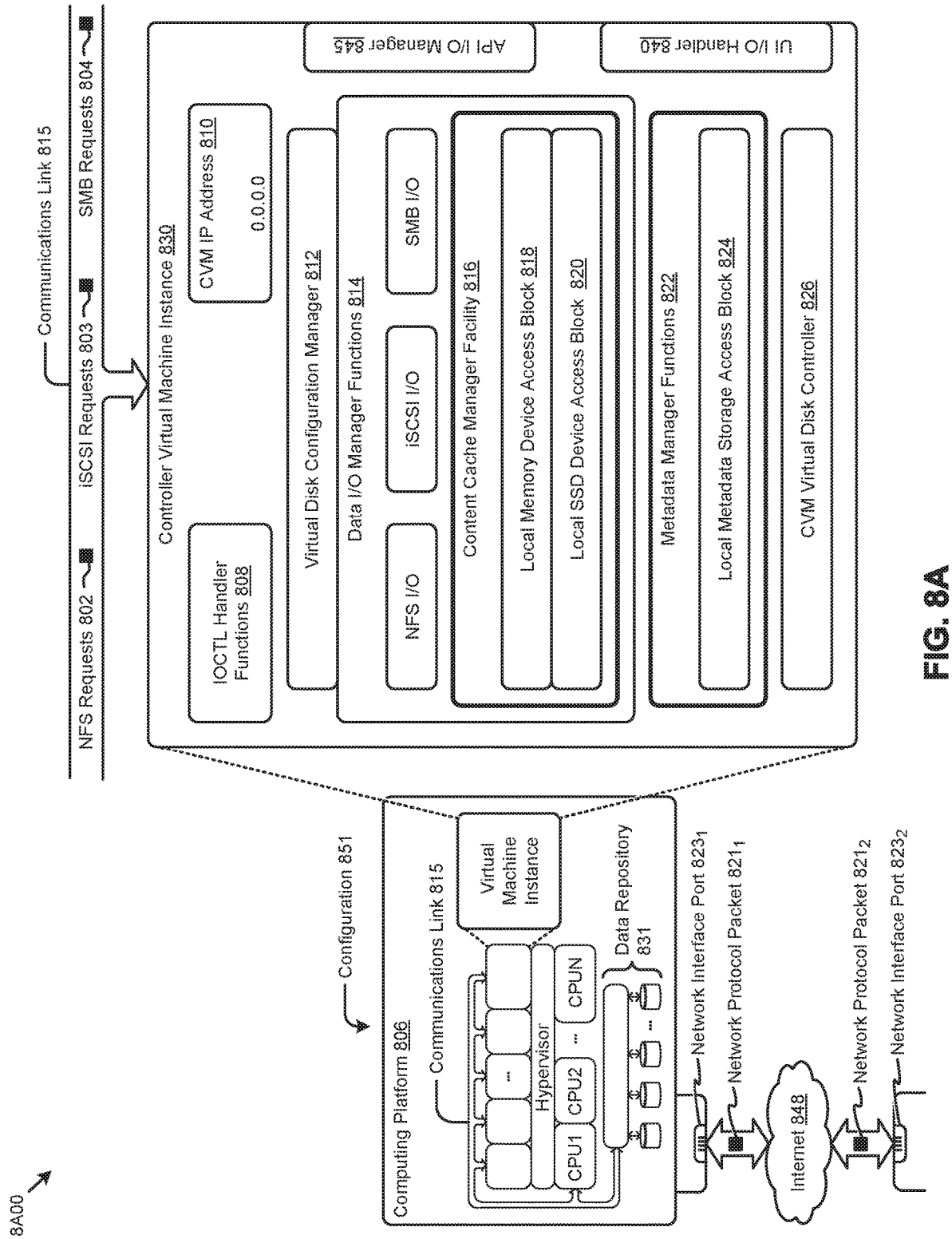
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to batch management of virtualized entities in virtualization environments. In some embodiments, a module may include one or more state machines and/or combinational logic used to implement or facilitate the operational and/or performance characteristics pertaining to batch management of virtualized entities in virtualization environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of batch management of virtualized entities in virtualization environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to batch management of virtualized entities in virtualization environments, and/or for improving the way data is manipulated when performing computerized operations pertaining to applying a rule base to the then-current state attributes of a selected batch of virtualized entities to determine the operations to be executed so as to achieve a desired outcome at the virtualized entities.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
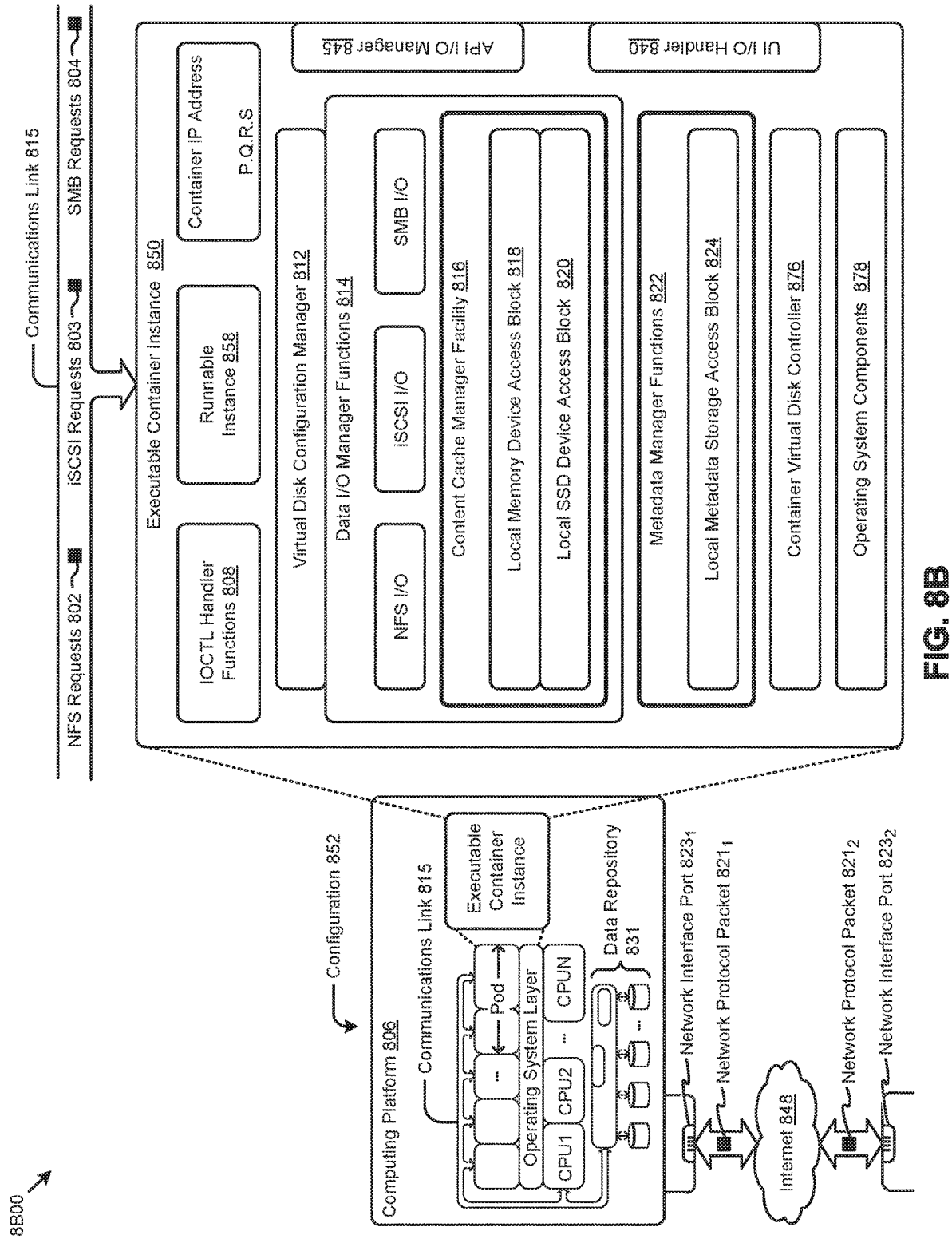

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
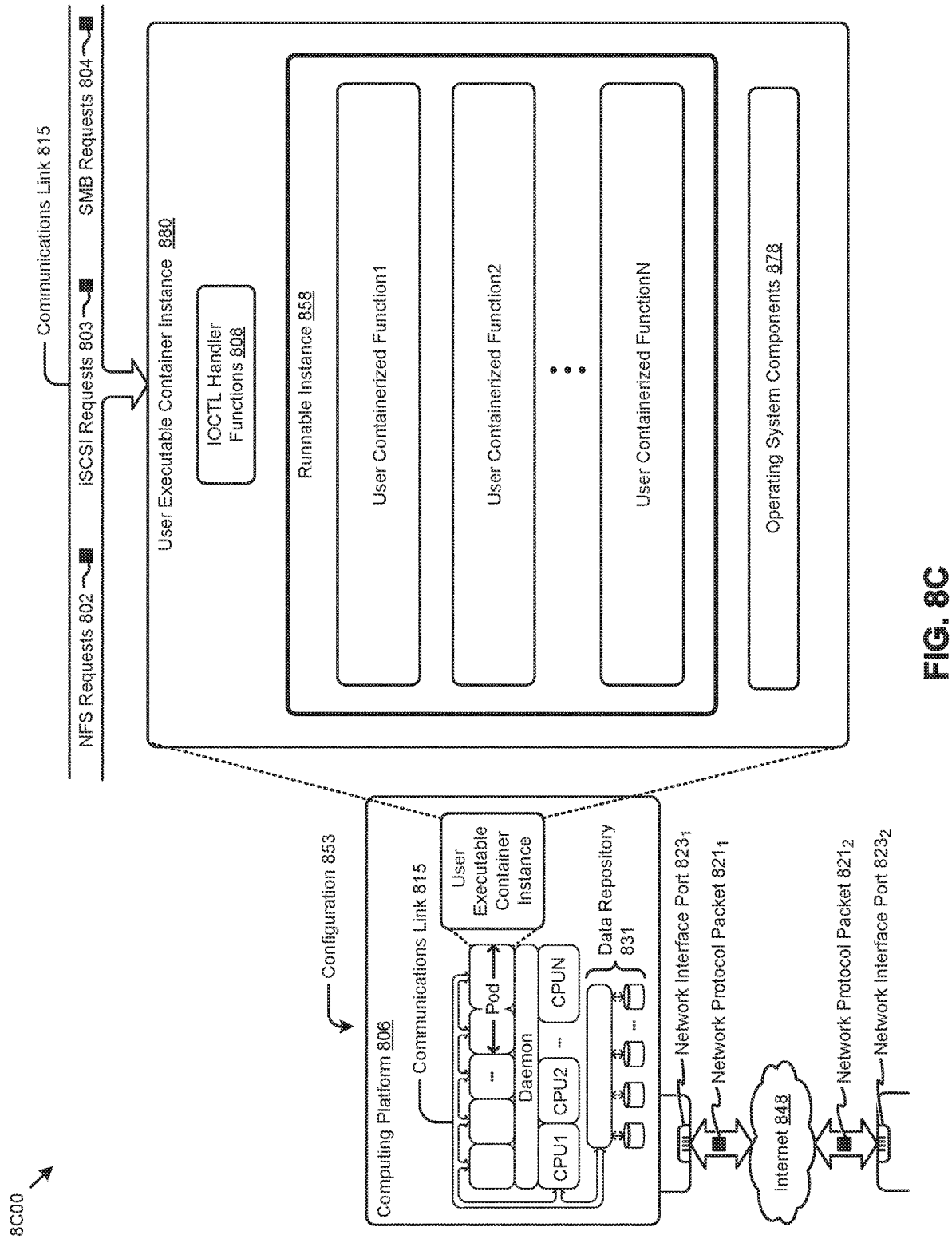

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   establishing a set of batch actions, wherein respective batch actions can be performed over at least one virtual machine of a plurality of virtual machines to achieve a outcome;
   receiving, in response to a user input, a selection of a batch action of the set of batch actions, the batch action to be performed on a first and second virtual machine of the plurality of virtual machines;
   generating a batch request to achieve the outcome specified by the selected batch action at the first virtual machine and the second virtual machine;
   accessing state attributes that characterize respective states of the first virtual machine and the second virtual machine;

determining a first entity-specific operation for the first virtual machine and a second entity-specific operation for the second virtual machine, wherein the first entity-specific operation is determined based on the state attribute of the first virtual machine and a first action rule, and the second entity-specific operation is determined based on the state attribute of the second virtual machine and a second action rule, and the first and second entity-specific operation comprises operations to achieve the outcome of the selected batch action, wherein the first entity-specific operation is different from the second entity-specific operation; and transmitting the first entity-specific operation to the first virtual machine for execution over the first virtual machine and the second entity-specific operation to the second virtual machine for execution over the second virtual machine to achieve the outcome corresponding to the selected batch action, wherein the first entity-specific operation transmitted to the first virtual machine and the second entity-specific operation transmitted to the second virtual machine are different.

2. The method of claim 1, further comprising:
identifying a first node that hosts the first virtual machine and a second node that hosts the second virtual machine.

3. The method of claim 1, wherein the first entity-specific operation is received at a first controller virtual machine on a first node that hosts the first virtual machine and the second entity-specific operation is received at a second controller virtual machine on a second node that hosts the second virtual machine.

4. The method of claim 3, wherein the first controller virtual machine executes the first entity-specific operation on the first virtual machine through a hypervisor-agnostic layer.

5. The method of claim 1, wherein a respective entity-specific operation comprises installing VM guest tools on the first virtual machine or the second virtual machine.

6. The method of claim 1, wherein at least one entity-specific operation is authorized with a user credential.

7. The method of claim 1, wherein a state of the first virtual machine is represented by a first state attribute and a state of the second virtual machine is represented by a respective state attribute.

8. A non-transitory computer readable medium having stored thereon a sequence of instructions which, when executed by a processor causes a set of acts comprising:
establishing a set of batch actions, wherein respective batch actions can be performed over at least one virtual machine of a plurality of virtual machines to achieve a outcome;
receiving, in response to a user input, a selection of a batch action of the set of batch actions, the batch action to be performed on a first and second virtual machine of the plurality of virtual machines;
generating a batch request to achieve the outcome specified by the selected batch action at the first virtual machine and the second virtual machine;
accessing state attributes that characterize respective states of the first virtual machine and the second virtual machine;
determining a first entity-specific operation for the first virtual machine and a second entity-specific operation for the second virtual machine, wherein the first entity-specific operation is determined based on the state attribute of the first virtual machine and a first action rule, and the second entity-specific operation is determined based on the state attribute of the second virtual machine and a second action rule, and the first and second entity-specific operation comprises operations to achieve the outcome of the selected batch action, wherein the first entity-specific operation is different from the second entity-specific operation; and transmitting the first entity-specific operation to the first virtual machine for execution over the first virtual machine and the second entity-specific operation to the second virtual machine for execution over the second virtual machine to achieve the outcome corresponding to the selected batch action, wherein the first entity-specific operation transmitted to the first virtual machine and the second entity-specific operation transmitted to the second virtual machine are different.

9. The non-transitory computer readable medium of claim 8, wherein the set of acts further comprise:
identifying a first node that hosts the first virtual machine and a second node that hosts the second virtual machine.

10. The non-transitory computer readable medium of claim 8, wherein the first entity-specific operation is received at a first controller virtual machine on a first node that hosts the first virtual machine and the second entity-specific operation is received at a second controller virtual machine on a second node that hosts the second virtual machine.

11. The non-transitory computer readable medium of claim 10, wherein the first controller virtual machine executes the first entity-specific operation on the first virtual machine through a hypervisor-agnostic layer.

12. The non-transitory computer readable medium of claim 8, wherein at least one entity-specific operation is authorized with a user credential.

13. The non-transitory computer readable medium of claim 8, wherein a respective entity-specific operation comprises installing VM guest tools on the first virtual machine or the second virtual machine.

14. The non-transitory computer readable medium of claim 8, wherein a state of the first virtual machine is represented by a first state attribute and a state of the second virtual machine is represented by a respective state attribute.

15. A system comprising:
a storage medium having stored thereon a sequence of instructions; and
a processor for executing the sequence of instructions to cause a set of acts comprising,
establishing a set of batch actions, wherein respective batch actions can be performed over at least one virtual machine of a plurality of virtual machines to achieve a outcome;
receiving, in response to a user input, a selection of a batch action of the set of batch actions, the batch action to be performed on a first and second virtual machine of the plurality of virtual machines;
generating a batch request to achieve the outcome specified by the selected batch action at the first virtual machine and the second virtual machine;
accessing state attributes that characterize respective states of the first virtual machine and the second virtual machine;
determining a first entity-specific operation for the first virtual machine and a second entity-specific operation for the second virtual machine, wherein the first entity-specific operation is determined based on the state attribute of the first virtual machine and a first action rule, and the second entity-specific operation is determined based on the state attribute of the second virtual machine and a second action rule, and the first and second entity-specific operation comprises operations to achieve the outcome of the selected batch action, wherein the first entity-specific operation is different from the second entity-specific operation; and transmitting the first entity-specific operation to the first virtual machine for execution over the first virtual machine and the second entity-specific operation to the second virtual machine for execution over the second virtual machine to achieve the outcome corresponding to the selected batch action, wherein the first entity-specific operation transmitted to the first virtual machine and the second entity-specific operation transmitted to the second virtual machine are different.

16. The system of claim 15, wherein the set of acts further comprise:

identifying a first node that hosts the first virtual machine and a second node that hosts the second virtual machine.

17. The system of claim 15, wherein the first entity-specific operation is received at a first controller virtual machine on a first node that hosts the first virtual machine and the second entity-specific operation is received at a second controller virtual machine on a second node that hosts the second virtual machine.

18. The system of claim 17, wherein the first controller virtual machine executes the first entity-specific operation on the first virtual machine through a hypervisor-agnostic layer.

19. The system of claim 15, wherein at least one entity-specific operations is authorized with a user credential.

20. The system of claim 15, wherein a respective entity-specific operation comprises installing VM guest tools on the first virtual machine or the second virtual machine.

21. The system of claim 15, wherein a state of the first virtual machine is represented by a first state attribute and a state of the second virtual machine is represented by a respective state attribute.

* * * * *